United States Patent Office 3,583,943
Patented June 8, 1971

3,583,943
**COATINGS BASED ON BLOCKED ISO-
CYANATE TERMINATED PREPOLYMERS
OF ISOCYANURATES**
Karl-Arnold Weber, Cologne-Stammheim, Hellmut Striegler, Leverkusen, Gerhard Berndt, Monheim, and Reiner Voigt, Opladen, Germany, assignors to Farbenfabriken Bayer Aktiengesellschaft, Leverkusen, Germany
No Drawing. Filed Sept. 4, 1968, Ser. No. 757,453
Claims priority, application Germany, Sept. 6, 1967,
F 53,427
Int. Cl. C08g 22/32, 53/14
U.S. Cl. 260—75                5 Claims

ABSTRACT OF THE DISCLOSURE

Coated substrates are prepared by a process which comprises treating a substrate material with a curable coating composition comprising (a) a ketoxime blocked isocyanate terminated reaction product of a polyol with an isocyanurate polyisocyanate, said reaction product having a molecular weight of from about 8,000 to about 15,000, (b) a tertiary aminoalcohol having at least two hydroxyl groups, optionally in the presence of (c) an inert organic solvent, and heating the coated substrate material to temperatures of from about 80° C. to about 200° C. to crosslink the curable coating composition.

---

This invention relates to a novel curable coating composition and to a process of preparing novel coated compositions utilizing the same. More particularly, this invention relates to novel curable single component, blocked isocyanate coating compositions and to a process of preparing coated compositions utilizing said novel blocked isocyanate coating compositions.

It has been heretofore known from German Pat. No. 957,564 that prepolymers containing free —NCO groups and which are derived from polyesters and polyfunctional polyisocyanates may be used to coat supporting materials such as textiles. In this instance, the components are applied from an organic solution or from an emulsion and are then treated with crosslinking substances such as, for example, water or polyfunctional, primary or secondary, aliphatic or aromatic amines, optionally in the presence of catalysts, such as tertiary amines or metal compounds that are soluble in organic solvents. It is, however, not possible by this process to produce finished coatings in a single operation. Moreover, the coating process cannot be controlled effectively so that reproducible coatings can be obtained. Additionally, it has been known that prepolymers of polyesters and polyfunctional isocyanates may also be used in masked form. According to U.S. Pat. No. 3,228,820, masked prepolymers of this type, having a molecular weight of from 400 to 6,000, are used for laminating purposes. Unfortunately, however, these prepolymers are not suitable for the production of suitable coatings.

It has also been known to employ the heretofore known coating solutions in conjunction with a crosslinking agent which has been painted onto a substrate to prepare polyurethane coatings. Also, coating compositions have been prepared by applying a polyurethane prepolymer having terminal hydroxyl groups to a support and then spraying the support with a organic polyisocyanate. Furthermore, the polyhydroxy compounds can be mixed with an organic polyisocyanate and then immediately applied to a support to obtain polyurethane coatings. The disadvantage with these processes is that they involve the use of at least two component systems which require additional operating steps in the application of a coating.

It is, therefore, an object of this invention to provide an improved curable polyurethane coating composition, a process for coating substrates with said curable polyurethane coating composition and coated substrate compositions thus prepared which are devoid of the problems and disadvantages set forth hereinbefore. Another object of this invention is to provide a stable, single component coating system for the preparation of polyurethane coated compositions. A still further object of this invention is to provide a curable polyurethane coating composition which may be cross-linked by heating and which contains a low solvent content. Still another object of this invention is to provide improved polyurethane coated compositions which may be rolled up and stored after the coating operation. Still another object of this invention is to provide an improved curable polyurethane coating composition which is storage stable. A still further object of this invention is to provide an improved curable polyurethane coating composition which avoids harmful physiological properties. A still further additional object of this invention is to provide coated compositions which do not discolor under the influence of light and which are of improved resistance to hydrolysis. Still another further additional object of this invention is to provide a polyurethane coated composition having improved mechanical properties. A still further additional object of this invention is to provide a process for the production of the hereinbefore described improved coated compositions utilizing the improved curable polyurethane coating compositions.

The foregoing objects and others which will become apparent from the following description are accomplished in accordance with this invention, generally speaking, by providing an improved coated composition obtained by a process which comprises treating a substrate support material with an improved single component curable polyurethane coating composition comprising a mixture of (A) a reaction product, containing isocyanate groups blocked with ketoximes, of (1) a polyhydroxyl compound with (2) an isocyanurate polyisocyanate and (B) a tertiary aminoalcohol containing at least two hydroxyl groups, and crosslinking the curable coating compositions by heat treating the coated substrate material. More particularly, the objects of this invention are accomplished by providing a coated composition which is prepared by a process which comprises applying to a substrate support material a single component curable polyurethane coating composition comprising (A) a ketoxime blocked isocyanate terminated reaction product of an organic polyol with an organic isocyanurate polyisocyanate, said reaction product having a molecular weight of from 8,000 to 15,000 and (B) a tertiary aminoalcohol having at least two hydroxyl groups, and heating the coated substrate material to temperatures of from about 80° C. to about 200° C. to crosslink the curable coating composition. Optionally, the novel curable polyurethane coating composition may contain as a third component (C) an inert organic solvent in an amount up to 20% by weight.

The process according to this invention wherein improved coated compositions are prepared from the hereinabove described novel curable polyurethane coating compositions has the following advantages over conventional coating processes: (1) all the components required to produce a high quality coating are present in one stable single component system; (2) crosslinking is accomplished by a heat treatment and (3) the curable coating composition generally has a low solvent content of no more than 20% by weight whereas previously, according to the prior art, at least twice that quantity of solvent, that is, about 40% by weight or more, was normally employed.

Generally, any suitable reaction product of an organic polyhydroxy compound with an organic isocyanurate polyisocyanate which contains isocyanate groups blocked with ketoximes may be used in the preparation of the curable coating compositions of this invention. These reaction products will preferably have a molecular weight of from 8,000 to 15,000. Any suitable polyhydroxy compounds may be used for the preparation of the ketoxime blocked isocyanate reaction products and include, for example, hydroxy polyesters, hydroxypolyesterurethanes, hydroxy polyethers, hydroxy polycarbonates, hydroxy polyacetals, copolymers containing hydroxyl groups of the type that can be obtained, for example, by polymerizing olefins, such as ethylene or propylene, with vinyl acetate followed by at least partial hydrolysis, and other similar polyhydroxy compounds. The preferred type of organic compound containing polyhydroxyl groups are hydroxy polyesters obtained from polycarboxylic acids and polyhydric alcohols. In the preparation of these hydroxy polyesters, suitable polycarboxylic acids include, for example, adipic acid, suberic acid, sebacic acid, phthalic acid, terephthalic acid, thiodiglycolic acid, aspartic acid, brassylic acid and the like. Polyhydric alcohols which maye be used in the preparation of either hydroxy polyesters or hydroxy polyethers include, for example, ethylene glycol, 1,3-propylene glycol, 1,4-butanediol, 1,6-hexanediol, bishydroxy methyl cyclohexane, trimethylolpropane, pentaerythritol, sorbitol and the like. Polyethers may be obtained from any suitable alkylene oxide or the like such as, for example, ethylene oxide, 1,2-propylene oxide, 1,2-butylene oxide, tetrahydrofuran and the like. Particularly preferred results are obtained by using a polyester obtained from adipic acid and ethylene glycol.

The hereinabove mentioned polyhydroxy compounds are reacted with an excess of an organic isocyanurate polyisocyanate in such a way that the reaction products contain free —NCO-groups and have molecular weights in a range of from 8,000 to 15,000. Any suitable organic isocyanurate polyisocyanate may be used including those prepared from aliphatic, cycloaliphatic, aromatic and heterocyclic isocyanates. Suitable organic isocyanurate polyisocyanates include, for example, such prepared from ethylene diisocyanate, ethylidene diisocyanate, propylene-1,2-diisocyanate, cyclohexylene-1,2-diisocyanate, m-phenylene diisocyanate, 1,4-tetramethylene diisocyanate, 1,6-hexamethylene diisocyanate, 2,4-toluylene diisocyanate, 2,6-toluylene diisocyanate and mixtures of 2,4- and 2,6-tolylene diisocyanate and mixtures of 2,4- and 2,6-tolylene diisocyanate, methylcyclohexane - 2,4 - diisocyanate, methylcyclohexane - 2,6 - diisocyanate and mixtures of methylcyclohexane-2,4-diisocyanate and methylcyclohexane-2,6-diisocyanate or mixtures of the mentioned isocyanates. A trimerized aromatic diisocyanate such as trimerized 2,4-tolylene diisocyanate or trimerized 2,6-tolylene diisocyanate, trimerized 1-chlorophenyl-2,4-diisocyanate, trimerized 3,3'-dimethoxy-4,4'-biphenylene diisocyanate, trimerized 3,3'-diphenyl-4,4'-biphenylene diisocyanate, trimerized 4,4'-biphenylene diisocyanate, trimerized diphenylmethane - 4,4' - diisocyanate, trimerized 1,5-naphthylene diisocyanate, trimerized 1,6-hexamethylene diisocyanate with a tolylene diisocyanate are preferred. Coated compositions of particularly preferred properties are obtained with trimerized 2,4-tolylene diisocyanate or trimerized 2,6-tolylene diisocyanate or with 1,6-hexamethylene diisocyanate especially with a polyester of adipic acid and ethylene glycol because the coatings obtained are coatings of exceptional stability against discoloration under the effects of light and provide particularly good waterproof impregnation.

The isocyanate groups of the reaction products containing free —NCO-groups are blocked by means of equivalent quantities of ketoximes. Any suitable ketoximes may be employed in the process of this invention such as, for example, dimethyl ketoxime, methyl ethyl ketoxime, methyl isobutyl ketoxime, benzophenone oxime, cyclohexanone oxime, acetophenone oxime and the like. Although the prepolymer and the ketoxime blocking agent may be pre-reacted before the blocked system is put into an inert organic solvent, one may react the two materials in an organic solvent to avoid the processing problems that may otherwise arise. When the reactants are reacted in an inert organic solvent, any suitable inert organic solvent may be employed such as, for example, ethyl acetate, ethylene glycol monomethyl ether acetate and the like.

The ketoxime blocked isocyanate terminated reaction product is mixed with a tertiary aliphatic amine containing at least two hydroxyl groups. The tertiary amine is generally added in a quantity of from about 3% to about 6% by weight based on the solids content. Any suitable tertiary aliphatic amine containing at least two hydroxyl groups may be used according to the process of this invention and include such suitable amines as, for example, N - methyl - diethanolamine, triisopropanolamine, triethanolamine, butyl dibutanolamine, propyl dipropanolamine, triisobutanolamine, N,N,N',N' - tetrakis(hydroxypropyl)ethylene diamine, N,N,N',N' - tetrakis(hydroxybutyl) - ethylene diamine, N,N,N',N' - tetrakis(hydroxyethyl)ethylene diamine, N-mono(hydroxyethyl)-N,N',N'-tris(hydroxypropyl)ethylene diamine, and the like. In the curable coating composition of this invention the tertiary aminoalcohol acts both as a crosslinking agent and simultaneously as a catalyst for releasing the blocked or masked polyisocyanate.

If desired, an inert organic solvent may also be present during the preparation of these curable coating compositions, as a result of which highly concentrated solutions, which do not contain any more than about 20% by weight of solvent, are obtained. Thus, the curable coating composition of this invention may comprise from 80 to 100% by weight of ketoxime blocked isocyanate terminated reaction product and tertiary amino-alcohol and from 0 to 20% by weight of inert organic solvent. Any suitable inert organic solvent may be used in accordance with this invention. Suitable solvents include, for example, methylethylketone, diethylketone, methylpropylketone, dipropylketone, methylisobutylketone, acetone, ethyl acetate, butyl acetate, amyl acetate, dipropyl ether, benzene, toluene, xylene, dioxane, tetrahydrofuran, chlorobenzenes, dichlorobenzenes, nitroaliphatic solvents and the like and mixtures thereof.

The curable coating compositions of this invention are suitable for application directly or indirectly to any suitable substrate including, for example, textiles such as cotton, nylon, rayon and the like, films, paper, cardboard, rubber, wood, metals such as iron, aluminum, copper, steel and the like, polyurethane foams and the like. Fabrics in various forms such as denims, gabardines, khakis, non-woven fabrics, drills, twills and woven fabrics including natural fiber weaves from silk, cotton, linen, wool, jute, hemp, sisal, filaments and synthetic fiber weaves from cellulose acetate, cellulose triacetate, rayon, polyamides, polyesters, polyacrylates, polyethers, polyurethanes such as spandex fibers, polyolefins, polyvinyl halide and other filaments and/or weaves from compatible blends from any of the foregoing may be employed. Textile materials are, however, the preferred supporting substrate material.

The curable coating composition of this invention can, of course, include other conventional additives including, for example, color pigments and fillers such as, for example, titanium dioxide, carbon black, iron oxide, silica, talc and the like and can have incorporated therein spirit-soluble or fat-soluble dyestuffs.

The curable coating compositions of this invention may be applied in any suitable manner such as, for example, by means conventionally known for applying a coating to a substrate support such as, for example, by means of knife coating, doctor blades, by rolling, dipping, spraying, impregnating, rinsing, brushing and the like. After a brief pre-drying, an optional step, application of the curable coating composition may be repeated either once or a plurality of times, if desired. Then follows a heat treatment for a short period of time sufficient to crosslink the coating composition at an elevated temperature of from about 80° C. to about 200° C. as a result of which the isocyanate groups blocked with ketoximes are liberated and react with hydroxyl groups of the tertiary aminoalcohol, the reaction being accompanied by crosslinking.

The coatings produced in accordance with this invention have a number of particularly advantageous properties. Harmful physiological properties of the kind that exist in those cases where phenol is used as a blocking agent are avoided by the use of ketoximes as blocking agents. It is possible by way of the curable coating composition of this invention to obtain a coating which does not discolor under the influence of light, is firm in structure and resistant to hydrolysis. The aminoalcohol compounds added are crosslinked and do not give rise to any unpleasant odors of the kind given off when phenol is used for blocking. Advantages are afforded in particular by the crosslinking reaction being readily promoted by a heat treatment. The cooating is thus in its completed state on leaving the heating system and after cooling may be rolled up and optionally prepared for further processing whereas in previously known conventional processes the coating had to be after-treated in a chamber with steam or with amines in a gas phase. If these amines were added to the coating material immediately before processing, an additional operation of blending was involved in addition to which the stability of the resulting mixture was limited. Thus, it had to be processed without any undue delay. The alternative method of preparing the coating was by leaving it stand in air to crosslink by atmospheric moisture. This involved prolonged storage time as well as requiring the capacity for storing large quantities because the coated material could not be rolled up for storage. The process according to this invention does not have these disadvantages. Accordingly, the present invention provides a coated product of improved mechanical properties obtained by a process comprising coating a substrate supporting material with a curable polyurethane coating composition, comprising a mixture of a tertiary aminoalcohol having at least two hydroxyl groups and a reaction product containing isocyanate groups blocked with ketoximes and having a molecular weight of from about 8,000 to about 15,000 and produced by reacting a polyhydroxyl compound with an organic polyisocyanate, and crosslinking the curable coating composition applied to the supporting material by a heat treatment at temperatures in the range of from about 80° C. to 200° C. It is also possible to use the curable mixture of this invention for laminating purposes.

The invention is further illustrated but is not intended to be limited by the following examples in which all parts and percentages are by weight unless otherwise specified.

EXAMPLE 1

A raincoat fabric consisting of nylon-6 obtained by polycondensation of caprolactam or nylon-6,6 obtained by condensation of hexamethylene diamine with adipic acid in both warp and weft is coated on one side using a doctor blade with a composition prepared as described in the following:

The free —NCO-groups 3.5% free —NCO-groups) prepolymer of a molecular weight 8000 was prepared by further esterification of a linear polyester made from adipic acid and diethylene glycol of a molecular weight 2500 (OH-number 35–45) with adipic acid to a high molecular weight polyester with a OH-number 14 and reaction with trimeric tolylene-2,4-diisocyanate. 100 parts by weight of this prepolymer are dissolved in about 25 parts of ethyl acetate and the —NCO-groups are blocked by the addition of about 6.2 parts of dimethyl ketoxime, dissolved in about 10 parts of ethyl acetate. About 5 parts of N-methyl-diethanolamine are then added.

A total of two coatings is applied, each of which is briefly pre-dried and then heated for about 3 minutes at about 140° C. A waterproof impregnation of the nylon fabric is provided by the coating.

EXAMPLE 2

The free —NCO groups in about 100 parts of the prepolymer of Example 1 in solution in about 25 parts of ethyl acetate are blocked by about 7.5 parts of methyl ethyl ketoxime. About 5.3 parts of N,N,N′,N′-tetrakis (hydroxypropyl) ethylene diamine are then added. This coating composition is applied by means of a doctor blade to the roughened side of a Velvetone fabric. After the first thin coating, which is briefly pre-dried and heated for about 3 minutes at about 120° C., the fabric is calendered under about 100 kp./cm. pressure, related to the breadth of the fabric. Another thin coating is applied and is similarly pre-dried and then heated. Pigmented coating compositions are used for the following two thicker coats. For this purpose, about 100 parts of an inorganic or organic pigment dye (titanium dioxide [rutile]) are ground into about 107.5 parts of the prepolymer already blocked by methyl ethyl ketoxime and dissolved in about 25 parts of ethyl acetate, before about 5.3 parts of N,N,N′,N′-tetrakis (hydroxypropyl)-ethylene diamine are added. Each coating is followed by brief pre-drying and heating for about 3 minutes at about 120° C. A soft artificial leather is obtained, being distinguished in particular by its resistance to discoloration under the effect of light.

EXAMPLE 3

The pigmented coating composition described in Example 2 is applied by means of a rubber blanket coater to a fabric or paper coated with silicone resin, briefly dried, and heated at about 120° C. for about 3 minutes. The operation may be repeated, depending upon the required thickness of the coating. The non-pigmented coating composition described in Example 2 is then applied. The roughened side of a Velvetone fabric is pressed onto the coating composition thus applied to a release fabric or paper, briefly pre-dried and heated for about 3 minutes at about 120° C.

The release fabric or paper coated with silicone resin is then drawn off, and an extremely soft artificial leather is thus obtained.

EXAMPLE 4

The curable coating composition described in Example 1 is applied by means of a roller to a polyurethane foam. Cotton fabric is then pressed onto it, followed by heating for about 3 minutes at about 140° C. after brief pre-drying.

Soft laminates are thus obtained which immediately show outstanding resistance to water heated to about 60° C., to trichloroethylene and to perchlorethylene.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

Comparison tests

The coating compositions prepared according to Examples 1 and 2 from a linear adipic acid ethylene glycol polyester, trimeric toluylene diisocyanate, dimethyl ketoxime and N-methyldiethanolamine as cross-linking agent (Product I) and from linear adipic acid ethylene glycol polyester, trimeric toluylene diisocyanate, methylethyl ketoxime and N,N,N',N'-tetrakis-hydroxypropyl ethylene diamine as cross-linking agent (Product II) are compared with Product III prepared according to Examples 2 and 3 of U.S. Pat. 3,248,259 (castor oil, toluylene diisocyanate, methylethyl ketoxime and N,N,N',N'-tetrakis-hydroxypropyl ethylene diamine as cross-linking agent). Product III was used in form of an 80 percent solution, since the emulsifiers required for preparing a dispersion were not available. Before processing 0.5 part of lead octoate as catalyst were mixed while stirring with 100 parts of an 80% solution. Product IV was used in form of a 70% solution, since the emulsifiers required for preparing a dispersion were not available. Before processing 0.5 part of lead octoate as catalyst were mixed while stirring with 100 parts of the 70% solution.

(A) The products were used transparent, i.e. unpigmented.

The table below shows the results of the film and coating test including to the DIN prescription. The evaluation of the products is as follows:

(I) The films are soft, slightly tacky and exhibit good strength properties. The coatings are flexible at temperatures down to −40° C. and are substantially insensitive to light and wet heat. As compared with conventional polyurethane coatings, the abrasion ranges within normal limits.

(II) The evaluation is as described sub (I).

(III) The films are hard, hardly tacky and exhibit good strength properties. As a result of the hardness of the product, the coatings break already at 0° C. The abrasion is very high. The strong tendency to discoloration is due to the use of toluylene diisocyanate.

(IV) The films are very soft and very tacky; they exhibit, in transparent form, a very poor tensile strength and, in pigmented form, a good tensile strength. The softness of the product allows a flexibility at temperatures down to −40° C. During abrasion the tackiness effects smearing of the emery paper so that the abrasion is within limits which are normal for polyurethane coatings. The tendency to discoloration is especially strong.

Thus, the comparative tests show the superiority, in the general behavior, of the products according to the invention over the products according to U.S. Pat. 3,248,259. As compared with Product I and Product II, Product III shows the following disadvantages:

Very hard, no flexibility in the cold, very high abrasion and a strong tendency to discoloration.

Product IV has the following disadvantages:

Very tacky, poor strength properties of the transparent films and a very strong tendency to discoloration.

FILM TEST

| Product | Transparent, tensile strength/elongation at break | | | | Pigmented, tensile strength/elongation at break | | | |
|---|---|---|---|---|---|---|---|---|
| | Shore A[6] | O-Value | Exposure to light for 110 hours [2] | Test under tropical conditions for 6 days at 70° C.[3] | Shore A[6] | O-Value | Exposure to light for 110 hours [2] | Test under tropical conditions for 6 days at 70° C |
| I | 33 | 38/320 | 61/120 | 33/160 | 52 | 56/340 | 176/170 | 85/210 |
| II | 33 | 17/320 | 91/190 | 64/120 | 54 | 60/260 | 167/140 | 85/130 |
| III | 50 | 20/140 | 72/60 | 100/50 | 67 | 62/160 | 118/50 | 140/70 |
| IV | 8 | 4/470 | 13/290 | 2/530 | 26 | 31/590 | 250/530 | 168/670 |

See footnotes at end of Coating Test Table.

COATING TEST

| Product | Transparent, discoloration | | | | Pigmented, discoloration | | | |
|---|---|---|---|---|---|---|---|---|
| | Abrasion[1] | Flexibility in the cold, ° C.[5] | Exposure to light for 110 hours [2] | Test under tropical conditions for 6 days [3] | Abrasion [4] | Flexibility in the cold, ° C.[5] | Exposure to light for 110 hours [2] | Test under tropical conditions for 6 days [3] |
| I | 48 | −40+ | 3 | 1 | 112 | −40(+) | 1 | 0 |
| II | 43 | −40+ | 2 | 1 | 193 | −40(+) | 1 | 0 |
| III | 293 | 0(+++) | 4 | 2 | 321 | 0(+++) | 3 | 1 |
| IV | 69 | −40(+) | 6 | 3 | 95 | −40(+) | 4 | 2 |

[1] Tensile strength in kp./cm.²/Elongation at break in percent DIN 53455.
[2] Exposure to light for 110 hours in the Xenotest. Coating test: 0=no discoloration; 6=strong discoloration.
[3] Test under tropical conditions for 6 days at 70° C. Coating test: 0=no discoloration; 6=strong discoloration.
[4] Abrasion according to Frank-Hauser in mg./50 cm.² of surface area after 1,000 revolutions at 1,000 g. load and emery (abrasive) paper 100 (according to DIN 53863).
[5] Flexibility in the cold according to DIN 53361: (+) no cracks; (++) small cracks; (+++) break.
[6] Shore A DIN 53505.

(B) 50 parts of a titanium dioxide pigment were blended while stirring with 100 parts of the solid binder (on a one-roller frame).

The products were used to prepare films and coatings. A primer coating was first applied with acrylic acid ester to prevent the low viscous products according to U.S. Pat. 3,248,259 from getting through the cotton popline fabric.

What is claimed is:

1. A curable coating composition comprising (a) a ketoxime blocked isocyanate terminated reaction product of a polyhydroxy compound with an isocyanate, said reaction product having a molecular weight of from about 8,000 to about 15,000, and (b) a tertiary aminoalcohol having at least two hydroxyl groups.

2. The curable coating composition of claim 1 in an inert organic solvent wherein the solvent is present in an amount up to 20% by weight.

3. The curable coating composition of claim 1 wherein the reaction product containing isocyanate groups blocked with a ketoxime is a reaction product of a hydroxyl polyester with an isocyanurate polyisocyanate.

4. The curable coating composition of claim 3 wherein the reaction product containing isocyanate groups blocked with a ketoxime is a reaction product of a polyester of adipic acid and diethylene glycol with a trimerized tolylene diisocyanate and has a molecular weight of about 8,000.

5. The curable coating composition of claim 4 wherein the trimerized tolylene diisocyanate is selected from the group consisting of trimerized 2,4-tolylene diisocyanate and trimerized 2,6-tolylene diisocyanate.

References Cited

UNITED STATES PATENTS

| | | | |
|---|---|---|---|
| 3,248,371 | 4/1966 | Damusis | 260—77.5 |
| 3,252,848 | 5/1966 | Borsellino | 156—307 |
| 3,454,533 | 7/1969 | Kerrigan et al. | 260—75 |

DONALD E. CZAJA, Primary Examiner

H. S. COCKERAM, Assistant Examiner

U.S. Cl. X.R.

117—138.5, 138.8, 161; 161—190; 260—30.4, 31.2, 31.4 32.4 32.8, 33.2, 33.6, 33.8, 37, 67, 77.5, 878